US005338597A

United States Patent [19]

Kurabayashi et al.

[11] Patent Number: 5,338,597

[45] Date of Patent: Aug. 16, 1994

[54] RECORDING MEDIUM AND INK-JET RECORDING METHOD EMPLOYING THE SAME

[75] Inventors: Yutaka Kurabayashi, Yokohama; Mamoru Sakaki, Sagamihara; Tomomi Kaneko, Yokohama, all of Japan

[73] Assignee: Canon Kabushiki Kaisha, Tokyo, Japan

[21] Appl. No.: 818,766

[22] Filed: Jan. 13, 1992

[30] Foreign Application Priority Data

Jan. 14, 1991 [JP] Japan .................................. 3-015979

[51] Int. Cl.[5] .................................................. B32B 9/00

[52] U.S. Cl. .................................... 428/195; 428/206; 428/330; 428/340; 428/402; 428/913; 346/135.1; 106/20 R

[58] Field of Search ............... 428/195, 204, 330, 341, 428/206, 340, 402, 913; 346/135.1; 106/20 R

[56] References Cited

U.S. PATENT DOCUMENTS 4,832,984 5/1989 Hasegawa et al. .................. 427/161
5,081,470 1/1992 Kurabayashi et al. ............... 346/1.1

FOREIGN PATENT DOCUMENTS 0218956 4/1987 European Pat. Off. .
0373573 6/1990 European Pat. Off. .
0405417 1/1991 European Pat. Off. .
54-59936 5/1979 Japan .
56-148585 11/1981 Japan .
58-136481 8/1983 Japan .
60-54915 3/1985 Japan .
61-63477 4/1986 Japan .
61-63526 4/1986 Japan .
61-277484 12/1986 Japan .
62-19483 1/1987 Japan .
63-89418 4/1988 Japan .

OTHER PUBLICATIONS

Off. Search Report for Eur. Pat. Appl. No. 92100444.6.

*Primary Examiner*—Patrick J. Ryan
*Assistant Examiner*—William A. Krynski
*Attorney, Agent, or Firm*—Fitzpatrick, Cella, Harper & Scinto

[57] ABSTRACT

A recording medium contains, within an ink absorbent substrate per se or in an ink receiving coat layer formed on a substrate, basic magnesium carbonate together with a cationic surfactant and/or a nonionic surfactant. The recording medium is suitably used for color ink jet recording of the both-ways serial printing type and eliminates substantially the tone difference between forward and backward printings and the discoloration during indoor storage.

8 Claims, 2 Drawing Sheets

RECORDING MEDIUM AND INK-JET RECORDING METHOD EMPLOYING THE SAME

BACKGROUND OF THE INVENTION

1. Field of the Invention

The present invention relates to a recording medium useful for color recording, and particularly for ink-jet color recording. The present invention also relates to a recording method employing the recording medium.

2. Related Background Art

Coated paper which has an ink-receiving layer which contains a porous inorganic pigment formed on an ink-absorbent paper base has been used for recording mediums for ink-jet recording as described in Japanese Patent Application Laid-Open No. 56-148585. The porous inorganic pigment contained in the coating layer is exemplified by silica having superior color-developing properties as described in Japanese Patent Application Laid-open No. 56-185690, and by many other materials including calcium carbonate, alumina, and so forth.

The aforementioned coated paper is required to have the performance of providing images in high density and high sharpness with high resolution, and is further required to be responsive to high-speed print output.

In serial type color ink-jet printers, in order to achieve high-speed print output, increasing the driving-frequency of the head is essential, and also important is the capability of the head to conduct printing both in the forward movement direction and in the backward movement direction. A color ink-jet system is considered as an example in which four ink heads respectively for the colors of black (Bk), yellow (Y), magenta (M) and cyan (C) are arranged in the order of Bk, Y, M, and C from the back side to the front side along the forward direction of the head movement. Here, the direction of the movement of the ink heads starting from the home position is defined to be "forward" direction, and the reversed direction to be "backward" direction. The order of the colors of dots plotted with the color inks to provide colors of red (R), green (G), and blue (B) in the forward movement of the head is reversed in the backward movement. With the coated paper derived in the above cited prior art techniques, reversal of the dotting order of color inks results in change of color tone at mixed color portions, which hinders printing in back-and-forth directions.

The above prior art techniques have further disadvantages as mentioned below. For example, when the silica having a large specific surface area as disclosed in Japanese Patent Application Laid-Open No. 56-185690 is used for obtaining a sharp image with high density, the dye applied on a recording medium changes its color over time to deteriorate the recorded image even when it is stored in ordinary environmental conditions, like posting on an indoor wall. On the contrary, with a pigment such as calcium carbonate, kaolin, and talc having a small specific surface area, the above-mentioned indoor discoloration is retarded, however the derived image density is low without sharp image quality. Therefore, the suppression of the indoor discoloration is not consistent with high image density, and this inconsistency could not be removed by prior techniques.

The inventors of the present invention became aware of the fact that the indoor discoloration of the recorded image results only when coated paper is used, and does not result when non-coated paper such as ordinary PPC paper is used, and also that this indoor discoloration differs intrinsically from the dye discoloration caused by projection of UV light or visible light, and arises even in the absence of the light.

The inventors considered that the indoor discoloration results from oxidative decomposition of the dye which is caused by interaction of the dye, the pigment and an oxidative gas with each other. Accordingly, it may be assumed that a larger specific surface area of the used pigment causes more rapid oxidative decomposition reactions. From this assumption, the fact is understood that the higher degree of indoor discoloration is caused on coated paper having larger specific surface area of the pigment used.

On the other hand, the image density will be higher if the active surface for dye absorption is larger in the vicinity near the surface layer of the coat layer.

The inventors of the present invention already proposed a recording medium free from the aforementioned problems of indoor discoloration and insufficient image density, as shown in EP 405 417 A1, etc. This recording medium, however, does not satisfactorily solve the problem of color tone change in printing in the back and forth directions.

SUMMARY OF THE INVENTION

A primary object of the present invention is to provide a recording medium which does not cause changes in printed-image quality even when the dotting order of ink colors is changed, and to provide a recording method employing the recording medium.

Another object of the present invention is to provide a recording medium which is superior in storability of the recorded images especially with less deterioration by indoor discoloration as well as in image density and is particularly suitable for ink-jet printing, and also to provide a recording method employing the recording medium.

According to an aspect of the present invention, there is provided a recording medium containing basic magnesium carbonate, and a cationic surfactant and/or a nonionic surfactant.

According to another aspect of the present invention, there is provided an ink-jet recording method in which ink is ejected through an orifice of an ink jet recording head onto a recording medium in response to a recording signal, the recording medium containing basic magnesium carbonate, and a cationic surfactant and/or a nonionic surfactant.

DESCRIPTION OF THE PREFERRED EMBODIMENTS

Figure 1:
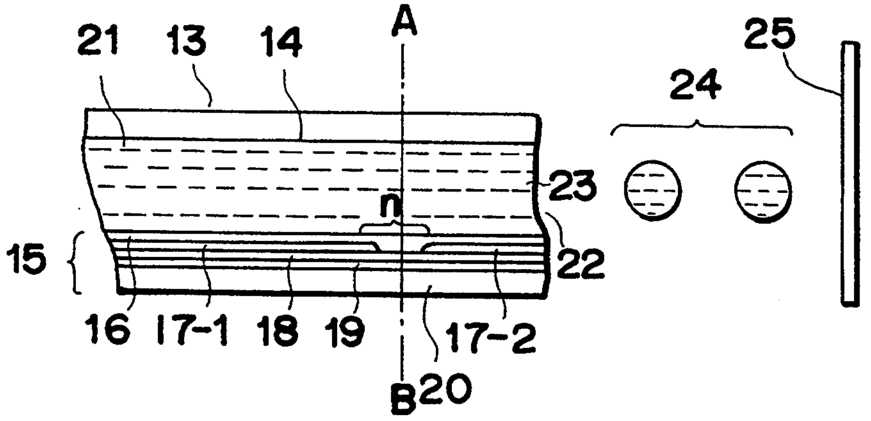
FIG. 1 illustrates a longitudinal cross section of a head portion of an ink-jet recording apparatus employed in the present invention.

The surfactant in the present invention functions to control the dynamic ink permeability of a recording medium, especially of one containing basic magnesium carbonate.

Usually, a coating layer composed of a particulate pigment, a binder, and an additive such as a waterproofing (dye fixing) agent tends to vary remarkably in permeation characteristics including the permeation rate and the running of ink depending on whether the layer is wet or dry. The wet and dry states have significant influence when paper having ink-absorbency is used as the base material; and the wet and dry states have much more significance where pigment light coated paper pigment or internal additive type paper having fiber of the base paper exposed at the surface of a recording medium is used as the recording medium. This is considered to be due to the relative change of the surface tension of the ink to the recording medium between a dry state and a wet state. This difference is assumed to be caused mainly by the characteristics of the materials constituting the coating layer including a pigment, a water-soluble resin, a binder, and the like, or the characteristics of pulp fiber, a sizing agent, and the like of the base paper.

In particular, the permeation rate and the permeation characteristics are liable to vary in the case where basic magnesium carbonate is used as the pigment. Such variation can be effectively controlled by using the specified surfactant in combination with the pigment.

In the present invention, the incorporation into the recording medium of a cationic surfactant and/or a nonionic surfactant selected from among a variety of surfactants is assumed to lower the surface tention of the ink to suppress the variation of dynamic permeability of the ink to the recording medium between a dry state and a wet state, especially of the recording medium containing basic magnesium carbonate.

The effect of the addition of surfactant of the present invention is particularly remarkable in the case where basic magnesium carbonate is used as the particulate pigment. More preferably, spherical basic magnesium carbonate particles are used for achieving a high image density. This is considered to be due to the fact that the spherical agglomerate of the basic magnesium carbonate leads to a denser packed state in the formation of the coating layer in comparison with the usual plate-shaped or column-shaped agglomerate of basic magnesium carbonate, and consequently the dye is caught nearer to the surface of the coating layer when compared at the same ink permeation rate. In other words, the active surface of the basic magnesium carbonate particles is considered to be more effectively utilized in the case where they are sphere-shaped than in the case where they are in other shapes.

Known spherical basic magnesium carbonate materials are however constituted of agglomerates having an average particle diameter ranging from about 3 to about 20 $\mu$m with broad particle-size distribution. Therefore, in a recording medium formed by applying a known spherical basic magnesium carbonate on a substrate, the void formed by the basic magnesium carbonate on the surface of the recording medium is not so uniform as that formed by fine particles of silica or alumina (having an average particle diameter of less than 3 $\mu$m). Accordingly, the variation of dynamic permeating property of ink may affect image qualities such as optical density, feathering, ink-running, etc. more greatly in the former recording medium. The difference in image quality caused by the change of the dotting order of the color inks can be effectively decreased particularly effectively by combined use of a cationic surfactant and/or a nonionic surfactant with basic magnesium carbonate as the main pigment in the present invention.

The present invention is described below in more detail by reference to the preferred embodiment.

In the recording medium of the present invention, the surfactant and the pigment may be contained in the substrate (base material), or may be contained in a coating layer formed on the substrate. The content of the surfactant in the present invention is preferably in the range of from 0.05 to 2.0% by weight, more preferably from 0.1 to 1.5% by weight based on the basic magnesium carbonate in order to achieve the above-mentioned effect more sufficiently. The content of the basic magnesium carbonate in the recording medium of the present invention is preferably in the range of from 0.2 to 50 g/m$^2$, more preferably from 0.2 to 20 g/m$^2$ to achieve the above-mentioned effect more sufficiently.

The substrate employed in the present invention is preferably ink-absorbent base paper, but is not limited thereto. For example, a film of a polymer such as polyester may be used as the substrate material. The preferred embodiment of the present invention is described below by taking the cases employing an ink-absorbent paper as the substrate.

The recording medium of the present invention is constituted from a substrate, basic magnesium carbonate, a cationic surfactant and/or a nonionic surfactant, and preferable other additives such as a binder, a dye fixing agent, and a fluorescent whitener.

The basic magnesium carbonate for use in the present invention is not specially restricted. The object of the present invention can be achieved satisfactorily with a commercially available magnesium carbonate. However, use of spherical basic magnesium carbonate is more preferable.

The spherical basic magnesium carbonate in the present invention is the one having a shape disclosed in Japanese Patent Application Laid-Open Nos. 60-54915, 61-63526, and 63-89418, but the process of its production is not limited to the process described therein.

The term "spherical" in the present invention concerns the shape of agglomerate of the primary particles, and does not necessarily mean a complete sphere shape. The preferred shape of the sphere is one having the ratio of the major axis length (a) to the minor axis length (b) in the range of $0.7 \leqq b/a \leqq 1.0$.

However, in the production of such spherical basic magnesium carbonate, the complete spherical shape of the product cannot always be obtained, depending on the reaction conditions modified for controlling the particle diameter, the specific surface area, the oil absorption, and other pigment properties. For example, particles lacking a portion of the sphere, or particles agglomerating in a flower-petal shape may be formed. In the present invention, particles with less than $\frac{1}{4}$ in volume of the assumed complete sphere are also included.

In the case where the primary particles constructing the agglomerate are relatively large and consequently the peripheral line tracing the outermost particles is remarkably rugged, the peripheral line is drawn so as to form a shape of a circle or an ellipse having the largest ratio of the aforementioned b/a within the allowable b/a ratio defined above.

Further, in the present invention, the basic magnesium carbonate containing the above-defined spherical particles in an amount of not less than 85% of the total particles is included in the spherical basic magnesium carbonate. A particle, which looks as if glued with another particle but more than half of the outline is discerned, is regarded as one agglomerated particle.

The average particle diameter of the spherical basic magnesium carbonate is in the range of from 0.5 to 20 μm, preferably from 1 to 12 μm. An excessively fine particle size causes lower ink absorbency, while an excessively large particle size may cause falling-off of the particles from the recording medium.

Here, the particle diameter means the major axis length "a" described above. The average particle diameter means a simple average of 100 or more of the major axis diameters "a" measured by electron microscopy. In the particle size distribution of the spherical basic magnesium carbonate, 95% or more in number of the particles have preferably a size of not larger than 25 μm, more preferably not larger than 15 μm, and still more preferably not larger than 10 μm.

An excessively large ratio in number of particles having larger size is undesirable because the dispersibility of particles is lowered to result in formation of larger agglomerate in slurry preparation, which adversely effects the coating suitability and printing suitability.

The specific surface area is measured by the BET method. The particles have the surface area particularly preferably in the range of from 10 $m^2/g$ to 70 $m^2/g$. With an excessively small specific surface area, the image density cannot be high, while with an excessively large specific surface area, resistance to indoor discoloration of the recording medium is low.

The surfactant for use in the present invention is exemplified below without limiting the invention in any way. The cationic surfactant is the one having a primary to quaternary ammonium group, a pyridinium group, or the like as the hydrophilic group, specific examples including:

cetyltrimethylammonium chloride,
stearyltrimethylammonium chloride,
behenyltrimethylammonium chloride,
octadecyltrimethylammonium chloride,
hexadecyltrimethylammonium chloride,
dodecyltrimethylammonium chloride,
dioctyldimethylammonium chloride,
distearyldimethylammonium chloride,
lauryldimethylbenzylammonium chloride,
myristyldimethylbenzylammonium chloride,
stearyldimethylbenzylammonium chloride,
tetradecyldimethylbenzylammonium chloride,
octadecyldimethylbenzylammonium chloride,
oxyethyldodecylamine, and the like.

The nonionic surfactant includes:

polyoxyethylene alkyl ether,
polyoxyethylene alkylphenol ether,
polyoxyethylene alkylphenyl ether,
polyoxyethylene aliphatic ester,
sorbitan ester ether,
sorbitan ester; and the like, but is not limited thereto.

In the present invention, other conventionally used inorganic or organic pigments may be used in combination with the spherical basic magnesium carbonate within the range in which the object of the present invention is achievable.

The inorganic pigment includes silica, alumina, aluminum silicate, magnesium silicate, hydrotalcite, calcium carbonate, titanium oxide, clay, talc, and the like, but is not limited thereto. The organic pigment is exemplified by plastic pigments such as urea resins, urea-formalin resins, polyethylene resins, polystyrene resins, and the like, but is not limited thereto. The mixing ratio of the pigment is preferably in the range of from 10 to 60% by weight based on the basic magnesium carbonate.

The binder for use in the present invention includes, for example, water-soluble polymers such as polyvinyl alcohol, starch, oxidized starch, cationic starch, casein, carboxymethylcellulose, gelatin, hydroxyethylcellulose, acrylic resins, and the like; water-dispersible polymers such as SBR latex, polyvinyl acetate emulsion, and the like; and combination of two or more thereof.

The preferred mixing ratio of the pigment and the binder (P/B) in the present invention is not lower than $\frac{1}{4}$ by weight in view of further improvement of ink absorbency of the ink-receiving layer, and not higher than 10/1 by weight in view of prevention of pigment-falling-off of the ink-receiving layer, more preferably being in the range of from 6/1 to 1/1.

Further in the present invention, the ink receiving layer may contain an additive, if necessary, such as a dye-fixing agent (waterproofing agent), a fluorescent whitener, a surfactant, an anti-foaming agent, a pH controlling agent, a mildewproofing agent, a UV absorbing agent, an anti-oxidizing agent, a dispersing agent, a viscosity-reducing agent, and the like. Such additives are arbitrarily selected from known compounds depending on the object.

The dye-fixing agent is explained as an example of the additives. The additional use of the following dye-fixing agent improves the water-resistance of the formed image.

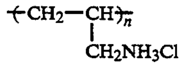

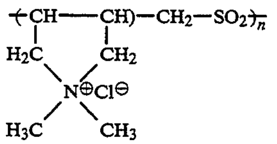

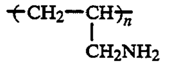

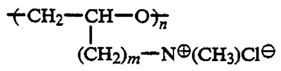

The above compounds are merely examples, and do not limit the present invention. The waterproofing effect of the dye-fixing agent depends on the kind of the dye used for ink-jet recording. Accordingly, the combination with the dye for recording have to be sufficiently examined.

The recording medium of the present invention is prepared by applying an aqueous coating liquid containing a pigment, a binder, and other additives by a known method such as a roll-coater method, a blade-coater method, an air-knife-coater method, a gate-roll-coater method, a size-press method, and the like onto the surface of a substrate, and then drying the coated matter by means of a hot-air drying oven, a hot drum, or the like. The recording medium may be further subjected to a supercalender treatment for the purpose of smoothing the surface of the ink-receiving layer or raising the surface strength of the ink-receiving layer.

The total amount of the coating of the pigment in the ink-receiving layer is preferably in the range of from 0.2 to 50 g/m$^2$, more preferably from 0.2 to 20 g/m$^2$. In using a small amount of the coating, a part of the substrate may be exposed on the surface. At the coating amount of less than 0.2 g/m$^2$, no effect is achieved in color development of the dye in comparison with the case of mediums having no ink-receiving layer, while at the coating amount of more than 50 g/m$^2$, pigment-falling-off occurs at the coating layer, which is undesirable. Meanwhile, the amount of the coating is in the range of from 0.5 to 100 $\mu$m in terms of layer thickness.

The ink itself for the ink-jet recording on the recording medium described above may be any known ink, which can be used without any inconvenience. The recording agent therefor may be a water-soluble dye such as direct dyes, acidic dyes, basic dyes, reactive dyes, and food dyes. Any dye for ink-jet recording use may be employed without any particular limitation, The particularly preferred embodiment of the recording method of the present invention is an ink-jet recording which employs a direct dye and/or an acidic dye as the recording agent. Although the relation thereof with the recording medium is not exactly known, the effect is assumed to be due to a chemical reaction with the basic magnesium carbonate contained or the cationic and/or nonionic surfactant in the recording medium, thereby sufficiently reducing the difference in color tone between the image formed by forward movement of head and the one formed by backward movement of the head, and yet retaining sufficient recording image density and sufficient resistance against indoor discoloration.

The aforementioned water-soluble dye is used conventionally in an amount ranging from about 0.1 to 20% by weight in an ink. In the present invention the dye may also be used in an amount in the same range.

The solvent for the aqueous ink of the present invention is water, or a mixed solvent of water and a water-soluble organic solvent. Particularly suitable is a mixed solvent of water and a water-soluble organic solvent, the water-soluble organic solvent containing a polyhydric alcohol which is effective to prevent drying of ink.

The method of recording by applying the ink on the aforementioned recording medium is preferably any ink-jet recording method, in which the ink is ejected through a nozzle to apply the ink onto the recording medium as an ejected-ink-receiving body.

In particular, the recording medium of the present invention is effectively used in the recording method in which an ink receives thermal energy to change its volume abruptly by phase transition and is ejected by the action caused by this volume change, as described in Japanese Patent Application Laid-Open No. 54-59936.

A recording apparatus is described below which is suitable for recording on the recording medium of the present invention.

Figure 2:
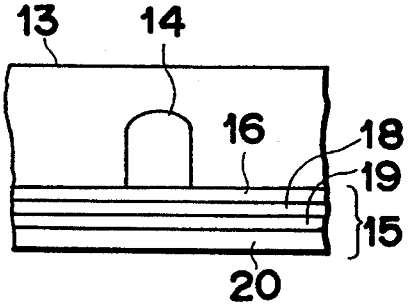
FIG. 2 illustrates a transverse cross section of a head portion of an ink-jet recording apparatus employed in the present invention.
Figure 3:
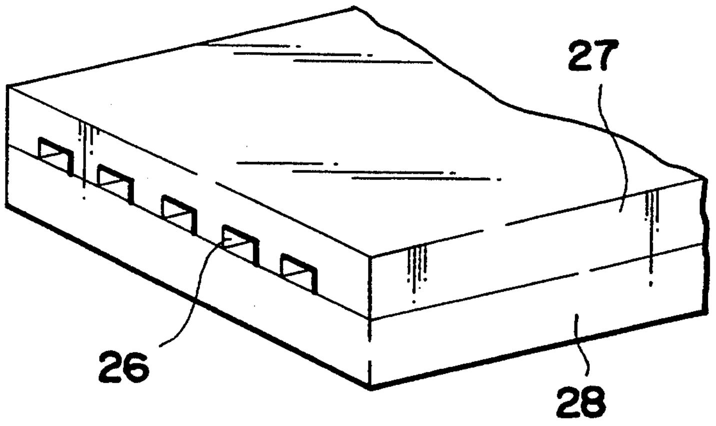
FIG. 3 is a perspective illustration of the appearance of a head having a multiple set of heads as shown in FIG. 1 and FIG. 2.

An example of the constitution of the heads, which is a main portion of the apparatus, is shown in FIG. 1, FIG. 2, and FIG. 3.

A head 13 is formed by bonding a plate of glass, ceramics, or plastics having a groove 14 for ink passage with a heat-generating head 15. (The type of the head is not limited to the one shown in the drawing.) The heat-generating head 15 is constituted of a protection layer 16 formed of silicon oxide or the like, aluminum electrodes 17-1 and 17-2, a heat-generating resistance layer 18 formed of nichrome or the like, a heat accumulation layer 19, and a substrate plate 20 having a high heat-releasing property made of alumina or the like.

Ink 21 reaches the ejection orifice 22 (a fine pore), forming a meniscus by action of pressure P not shown in the figure.

On application of an electric signal to the electrodes 17-1 and 17-2, the region designated by a symbol "n" of the heat-generation head 15 abruptly generates heat to form a bubble in the ink 21 at the position adjacent thereto. The pressure generated by the bubble pushes out the meniscus 23 and ejects the ink 21 from the orifice 22, as recording droplets 24, and the droplets are propelled to a recording medium 25. FIG. 3 illustrates exterior appearance of a multi-head constructed by juxtaposing a multiplicity of heads shown in FIG. 1. The multi-head is prepared by bonding a glass plate 27 having multi-grooves 26 with a heat-generation head 28 similar to the one described in FIG. 1.

Incidentally, FIG. 1 is a cross-sectional view of the head 13 along an ink flow path, and FIG. 2 is a cross-sectional view of the head at the line A–B in FIG. 1.

Figure 4:
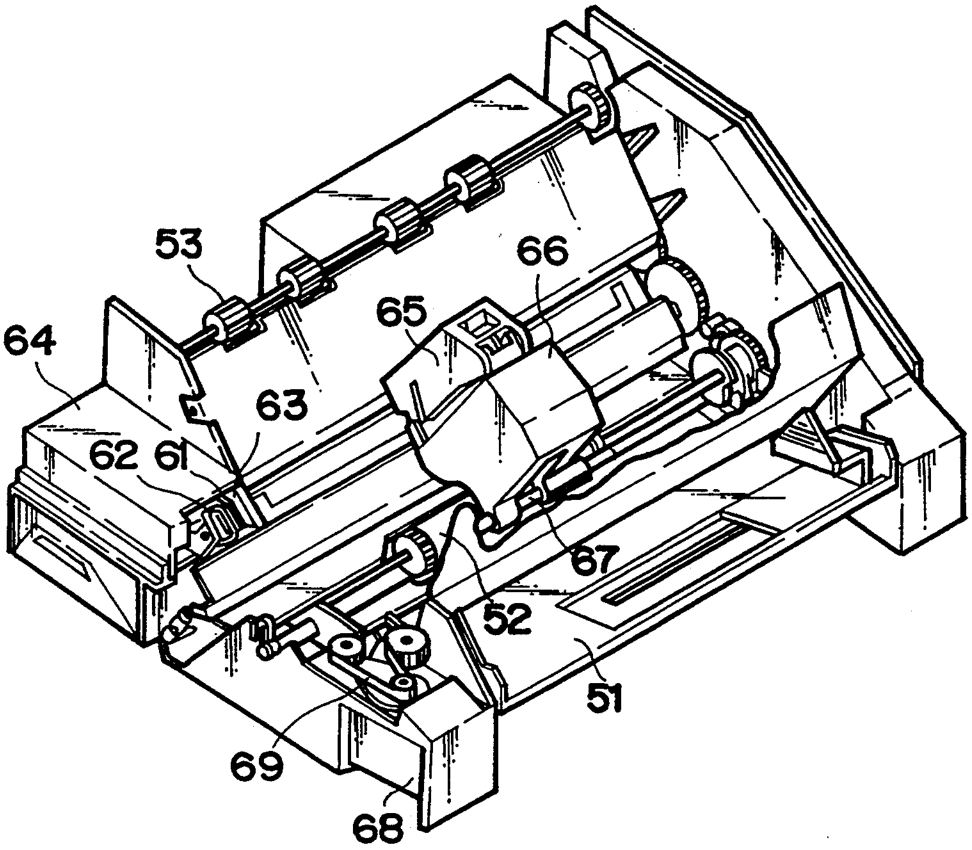
FIG. 4 is a perspective illustration of an example of an ink-jet recording apparatus.

FIG. 4 illustrates an example of the ink-jet recording apparatus having such a head mounted therein.

In FIG. 4, a blade 61 operating as a wiping member is held at one end by a blade-holding member, forming a fixed end in a shape of a cantilever. The blade 61 is placed at a position adjacent to the recording region of the recording head, and in this example, is held so as to protrude into the moving path of the recording head. A cap 62 is placed at a home position adjacent to the blade 61, and is constituted such that it moves in the direction perpendicular to the moving direction of the recording head to come into contact with the ejection nozzle face to cap the nozzles. An ink absorption member 63 is provided at a position adjacent to the blade 61, and is held so as to protrude into the moving path of the recording head in a manner similar to that of the blade 61. The aforementioned blade 61, the cap 62, and the absorption member 63 constitute an ejection-recovery section 64, the blade 61 and the absorption member 63 remove water, dust, and the like from the ink ejecting nozzle face.

A recording head 65 has an ejection energy generation means, and conducts recording by ejecting ink toward a recording medium opposing the ejection nozzle face. A carriage 66 is provided for supporting and moving the recording head 65. The carriage 66 is slideably engaged with a guide rod 67. A portion of the carriage 66 is connected (not shown in the drawing) to a belt 69 driven by a motor 68, so that the carriage 66 is movable along the guide rod 67 to the recording region of the recording head and the adjacent region thereto.

The constitution of a paper delivery portion 51 for delivery of a recording medium and a paper delivery roller 52 driven by a motor not shown in the figure delivers the recording medium to the position opposing to the ejecting nozzle face of the recording head, and the recording medium is discharged with the progress of recording to a paper discharge portion provided with paper-discharge rollers 53.

In the above constitution, the cap 62 of the ejection-recovery portion 64 is positioned away from the moving path of the recording head 65 during returning of the head to the home position at the end of the recording, etc., while the blade 61 is made to protrude into the moving path. Therefore, the ejecting nozzle face of the recording head 65 is wiped therewith. The cap 62 moves to protrude toward the moving path of the recording head 65 when the cap 62 comes into contact for capping with the ejecting nozzle face of the recording head 65.

At the time when the recording head 65 moves from the home position to the record-starting position, the cap 62 and the blade 61 are at the same position as in the above-mentioned wiping, so that the ejection nozzle face of the recording head is wiped also in this movement.

The recording head moves to the home position not only at the end of the recording and at the time of ejection recovery, but also at a predetermined interval during movement for recording in the recording region. By such movement, the wiping is conducted.

The present invention is described in more detail by reference to examples. In the examples, the terms "part" and "%" are based on weight unless otherwise mentioned.

EXAMPLE 1 AND COMPARATIVE EXAMPLE 1

Method for Preparing Recording Medium

The constitutional elements in the Example and Comparative Example are listed below:

Substrate material:

Wood-free paper (Ginwa, made by Sanyo Kokusaku Pulp Co, Ltd.)

Coating material:

(1) Basic magnesium carbonate ( dense magnesium carbonate, made by Konoshima Kagaku K.K., average primary particle diameter: 0.47 μm, specific surface area: 27 $m^2/g$, bulk density: 0.44 g/cc, oil absorption: 79 ml/100 g), (2) Binder (PVA-217, made by Kuraray Co., Ltd., saponification degree: 89 mol %, polymerization degree: 1700), (3) Waterproofing agent (polyallylamine hydrochloride, PAA-HCl-3L, made by Nitto Boseki Co., Ltd., average molecular weight: 10,000), (4) Cationic surfactant (Coatamine 24P, made by Kao Corporation, lauryltrimethylammonium chloride).

The recording medium was prepared in the manner described below.

First, 15 parts of the Pigment (1), basic magnesium carbonate, was mixed with 85 parts of water, and the mixture was stirred for 15 minutes by means of a commercial homogenizer at a stirring rate of 10,000 rpm. To the mixture, a separately prepared binder solution (aqueous 10% polyvinyl alcohol solution) was added in an amount to give a pigment/binder ratio (solid ratio) of 2/1, and stirred for 5 minutes. The aforementioned Additive (3) was added thereto in a ratio of 10% (solid ratio) based on the Pigment (1), and stirred for 5 minutes. Further thereto, the Surfactant (4) was added at a ratio (solid ratio) of 0.5% based on the Pigment (1), and stirred further for 5 minutes to provide a coating liquid.

The resulting coating solution was applied on the aforementioned substrate material with a wire bar coater. The coated matter was dried at 110° C. for 5 minutes, and treated with a supercalender. Thus the recording medium of the present invention was prepared.

The recording medium employed in Comparative Example 1 was prepared in the same manner as in Example 1 except that the cationic surfactant (5) was not used.

The recording mediums for Examples 2 to 5 and Comparative Example 2 to 6 were prepared in the same manner as above.

Table 1 summarizes the constitutional elements and their mixing ratio used in Examples 2 to 5 and Comparative Examples 2 to 6. As the substrate material, ink-absorbent paper was consistently used which had a basis weight of 100 $g/m^2$, thickness of 100 μm, and a sizing degree of 2 seconds, and contained calcium carbonate as a filler at a content of 6.5% in terms of ash according to JIS-P-8128. The amount of coating was adjusted to be 6 $g/m^2$ as dry coating matter.

TABLE 1

EXAMPLE 2

Pigment: Spherical basic magnesium carbonate (average particle diameter: 5.0 μm, bulk density: 0.3 g/cc, specific surface area: 30 $m^2/g$, oil absorption: 70 ml/100 g): 15 parts Binder: PVA-217: 6 parts Waterproofing agent: Dimethyldiallylammonium chloride-acrylamide copolymer (PAS-J41, made by Nitto Boseki Co. Ltd., average molecular weight: 10,000): 3 parts Surfactant: Cation BB (dodecyltrimethylammonium chloride, made by Nippon Oil and Fat Co., Ltd.): 0.075 part

EXAMPLE 3

Pigment: The same as in Example 2

Binder: The same as in Example 2

Waterproofing agent: The same as in Example 2

Surfactant: Nonion T-208.5 (polyoxyethylene tridecyl ether, made by Nippon Oil and Fat Co., Ltd.): 0.070 part

EXAMPLE 4

Pigment: The same pigment as in Example 2: 10 parts, and Silica (Fine Sil K-40, made by Tokuyama Soda Co, Ltd., average particle diameter: 1.5 μm, specific surface area: 300 $g/m^2$): 5 parts Binder: The same as in Example 2

Waterproofing agent: PAA-HCl-3L: 1.5 parts

Surfactant: The same as in Example 3

EXAMPLE 5

Pigment: The same pigment as in Example 2: 10 parts, and alumina (Aluminum oxide C, made by Degussa CO., average particle diameter: 20 nm, specific surface area: 100 $g/m^2$): 5 parts Binder: The same as in Example 2

Waterproofing agent: The same as in Example 4

Surfactant: Electrostripper QN (made by Kao Corporation): 0.05 part

COMPARATIVE EXAMPLE 2

Pigment: The same as in Example 2

Binder: The same as in Example 2

Waterproofing agent: The same as in Example 4

Surfactant: Not used

COMPARATIVE EXAMPLE 3

Pigment: The same as in Example 4

Binder: The same as in Example 2

Waterproofing agent: The same as in Example 4

Surfactant: Not used

COMPARATIVE EXAMPLE 4

Pigment: The same as in Example 5
Binder: The same as in Example 2
Waterproofing agent: The same as in Example 4
Surfactant: Not used

COMPARATIVE EXAMPLE 5

Pigment: Silica (Finesil K-40, made by Tokuyama Soda Co., Ltd.)
Binder: The same as in Example 2
Waterproofing agent: The same as in Example 4
Surfactant: Sanisol (alkylbenzylmethylammonium chloride, made by Kao Corporation): 0.075 part

COMPARATIVE EXAMPLE 6

Pigment: The same as in Comparative Example 5
Binder: The same as in Example 2
Waterproofing agent: The same as in Example 4
Surfactant: Not used

COMPARATIVE EXAMPLES 7–9

The recording mediums for comparison were prepared in the same manner as in Example 1 except that the anionic surfactants below were used respectively in place of the cationic surfactant of Example 1.

Comparative Example 7:
Polyoxyethylene octylphenol ether sulfate (made by Matsumoto Yushi K.K.)
Comparative Example 8:
Sodium dicetylsulfosuccinate (made by Matsumoto Yushi K.K.)
Comparative Example 9:
Potassium alkylphosphate (made by Matsumito Yushi K.K.)

With the above recording mediums, color ink-jet recording was conducted by use of the inks having the compositions below in an amount of 8 nQ/mm$^2$ for single color ink dot in the two ink-dotting orders of C→M→Y→Bk and Bk→Y→M→C→Bk.

Ink composition

| | |
|---|---|
| Dye | 5 parts |
| Diethylene glycol | 20 parts |
| Water | 80 parts |

Dyes
Y: C.I. Direct Yellow 86
M: C.I. Acid Red 35
C: C.I. Direct Blue 199
Bk: C.I. Food Black 2

The image density of the solid-print portions of the single colors and the mixed colors were evaluated.

Solid printing was conducted with black color ink and the combinations of two color inks of yellow and magenta, magenta and cyan, and cyan and yellow with the head movement in the forward direction and in the backward direction, thus changing the order of the dotting of the ink colors. The reflective optical densities of each of the colors of the solid prints were measured by means of MacBeth Reflactodensitometer RD-918. The results of the measurement are shown in Table 2.

TABLE 2

| | OD (Bk) | Direction | OD R(M/Y) | OD G(C/Y) | OD B(C/M) |
|---|---|---|---|---|---|
| Example 1 | 1.38 | forward | 1.40/1.28 | 1.40/1.26 | 1.42/1.38 |
| | | backward | 1.41/1.29 | 1.42/1.28 | 1.40/1.40 |
| Comparative Example 1 | 1.38 | forward | 1.43/1.27 | 1.40/1.26 | 1.40/1.37 |
| | | backward | 1.35/1.35 | 1.35/1.35 | 1.35/1.45 |
| Example 2 | 1.35 | forward | 1.36/1.25 | 1.35/1.25 | 1.34/1.32 |
| | | backward | 1.36/1.25 | 1.34/1.26 | 1.35/1.33 |
| Example 3 | 1.35 | forward | 1.35/1.24 | 1.34/1.26 | 1.35/1.32 |
| | | backward | 1.35/1.25 | 1.35/1.25 | 1.34/1.34 |
| Comparative Example 2 | 1.34 | forward | 1.36/1.26 | 1.34/1.25 | 1.35/1.31 |
| | | backward | 1.30/1.32 | 1.28/1.35 | 1.30/1.37 |
| Example 4 | 1.40 | forward | 1.40/1.28 | 1.40/1.27 | 1.42/1.35 |
| | | backward | 1.40/1.29 | 1.41/1.28 | 1.43/1.36 |
| Comparative Example 3 | 1.40 | forward | 1.40/1.23 | 1.40/1.22 | 1.40/1.36 |
| | | backward | 1.32/1.28 | 1.33/1.28 | 1.35/1.40 |
| Example 5 | 1.42 | forward | 1.45/1.30 | 1.42/1.30 | 1.41/1.40 |
| | | backward | 1.47/1.31 | 1.41/1.32 | 1.40/1.40 |
| Comparative Example 4 | 1.43 | forward | 1.45/1.25 | 1.41/1.24 | 1.42/1.40 |
| | | backward | 1.38/1.30 | 1.35/1.29 | 1.37/1.45 |
| Comparative Example 5 | 1.45 | forward | 1.50/1.35 | 1.45/1.35 | 1.46/1.40 |
| | | backward | 1.40/1.40 | 1.40/1.40 | 1.38/1.50 |
| Comparative Example 6 | 1.45 | forward | 1.50/1.35 | 1.46/1.35 | 1.44/1.39 |
| | | backward | 1.40/1.40 | 1.38/1.38 | 1.37/1.47 |
| Comparative Example 7 | 1.33 | forward | 1.35/1.10 | 1.36/1.08 | 1.37/1.24 |
| | | backward | 1.18/1.28 | 1.22/1.27 | 1.22/1.33 |
| Comparative Example 8 | 1.32 | forward | 1.35/1.08 | 1.37/1.09 | 1.37/1.22 |
| | | backward | 1.18/1.28 | 1.21/1.26 | 1.24/1.35 |
| Comparative Example 9 | 1.32 | forward | 1.36/1.10 | 1.38/1.08 | 1.36/1.24 |
| | | backward | 1.17/1.29 | 1.25/1.26 | 1.24/1.35 |

In Table 2, the term "OD R(M/Y)" means the reflective optical densities of magenta color and yellow color at the yellow/magenta solid print portion, and the terms "OD G(Y/C)" and "OD B(C/M)" have analogous meaning. The term "forward" means the printing with the head moving in the forward direction, and the term "backward" means the printing with the head moving in the backward or reversed direction.

As shown clearly in Table 2, the presence of the basic magnesium carbonate and a cationic surfactant and/or a nonionic surfactant resolves the difference of color tone between the mixed color portions dotted with different order of ink colors.

The present invention provides printed images having consistent color tone by use of a serial type color ink-jet printer regardless of the movement direction of the head, thus enabling high-speed printing.

What is claimed is:

1. A recording medium comprising a substrate having an ink-receiving layer which contains basic magnesium carbonate, and a cationic surfactant and/or a nonionic surfactant, wherein the recording medium contains said surfactant in a range of from 0.05 to 2.0% by weight based on said basic magnesium carbonate.

2. A recording medium according to claim 1, wherein said basic magnesium carbonate is spherical basic magnesium carbonate.

3. A recording medium according to claim 2, wherein said spherical basic magnesium carbonate is in a shape of a sphere having the ratio of major axis length a to minor axis length b in the range of $0.7 \leqq b/a \leqq 1.0$.

4. A recording medium according to claim 1, wherein the recording medium contains said basic magnesium carbonate at a content in the range of from 0.2 to 50 $g/m^2$.

5. A recording medium according to claim 1, wherein the recording medium further contains a dye fixing agent.

6. A recording medium according to claim 7, wherein said substrate is paper.

7. An ink jet recording method comprising the steps of:

providing an ink jet recording head having an orifice for ejecting ink onto a recording medium in response to a recording signal, the recording medium having on a substrate an ink-receiving layer which contains basic magnesium carbonate, and a cationic surfactant and/or a nonionic surfactant; and ejecting ink through said orifice onto the recording medium in response to the recording signal, wherein the recording medium contains said surfactant in a range of from 0.05 to 2.0% by weight based on said basic magnesium carbonate.

8. A recording medium according to claim 2, wherein the average particle diameter of said spherical basic magnesium carbonate is from 0.5 to 20 $\mu m$ and the specific surface area therof obtained by the BET method is from 10 to 70 $m^2/g$.

* * * * *

UNITED STATES PATENT AND TRADEMARK OFFICE

CERTIFICATE OF CORRECTION

PATENT NO. : 5,338,597

DATED : August 16, 1994

INVENTOR(S) : YUTAKA KURABAYASHI, ET AL.

It is certified that error appears in the above-identified patent and that said Letters Patent is hereby corrected as shown below:

COLUMN 3

Line 31, "tention" should read --tension--.
Line 68, "particularly effec-" should be deleted.

COLUMN 4

Line 1, "tively" should be deleted.

COLUMN 5

Line 24, "effects" should read --affects--.

COLUMN 7

Line 29, "head" should read --the head--.

COLUMN 11

Line 65, "8 n$Q$/mm$^2$" should read --8 nl/mm$^2$--.

UNITED STATES PATENT AND TRADEMARK OFFICE
CERTIFICATE OF CORRECTION

PATENT NO. : 5,338,597

DATED : August 16, 1994

INVENTOR(S) : YUTAKA KURABAYASHI, ET AL.

It is certified that error appears in the above-identified patent and that said Letters Patent is hereby corrected as shown below:

COLUMN 14

Line 1, "claim 7," should read --claim 1,--.

Signed and Sealed this

Ninth Day of May, 1995

Attest:

BRUCE LEHMAN

Attesting Officer

Commissioner of Patents and Trademarks